Patented June 20, 1939

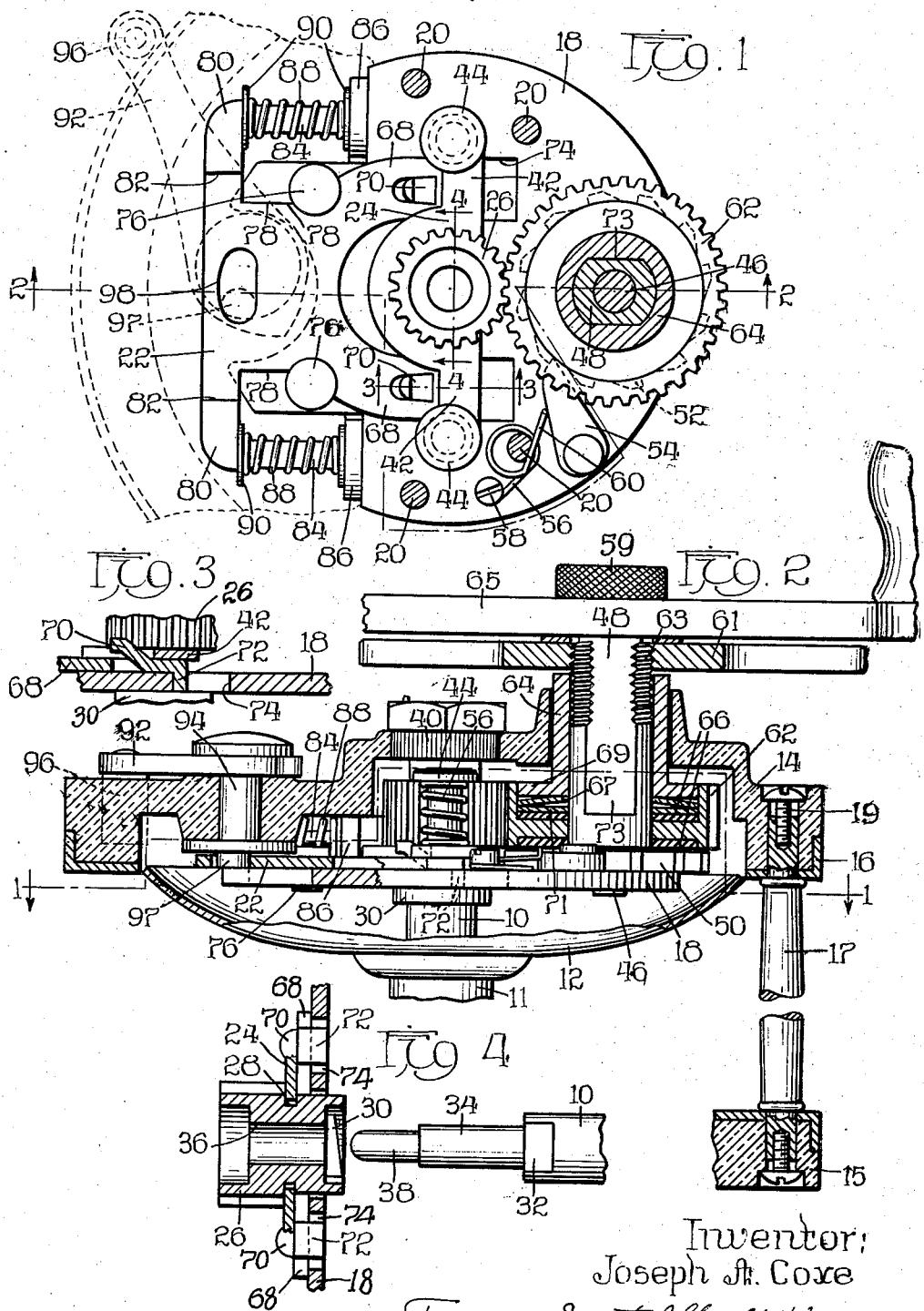

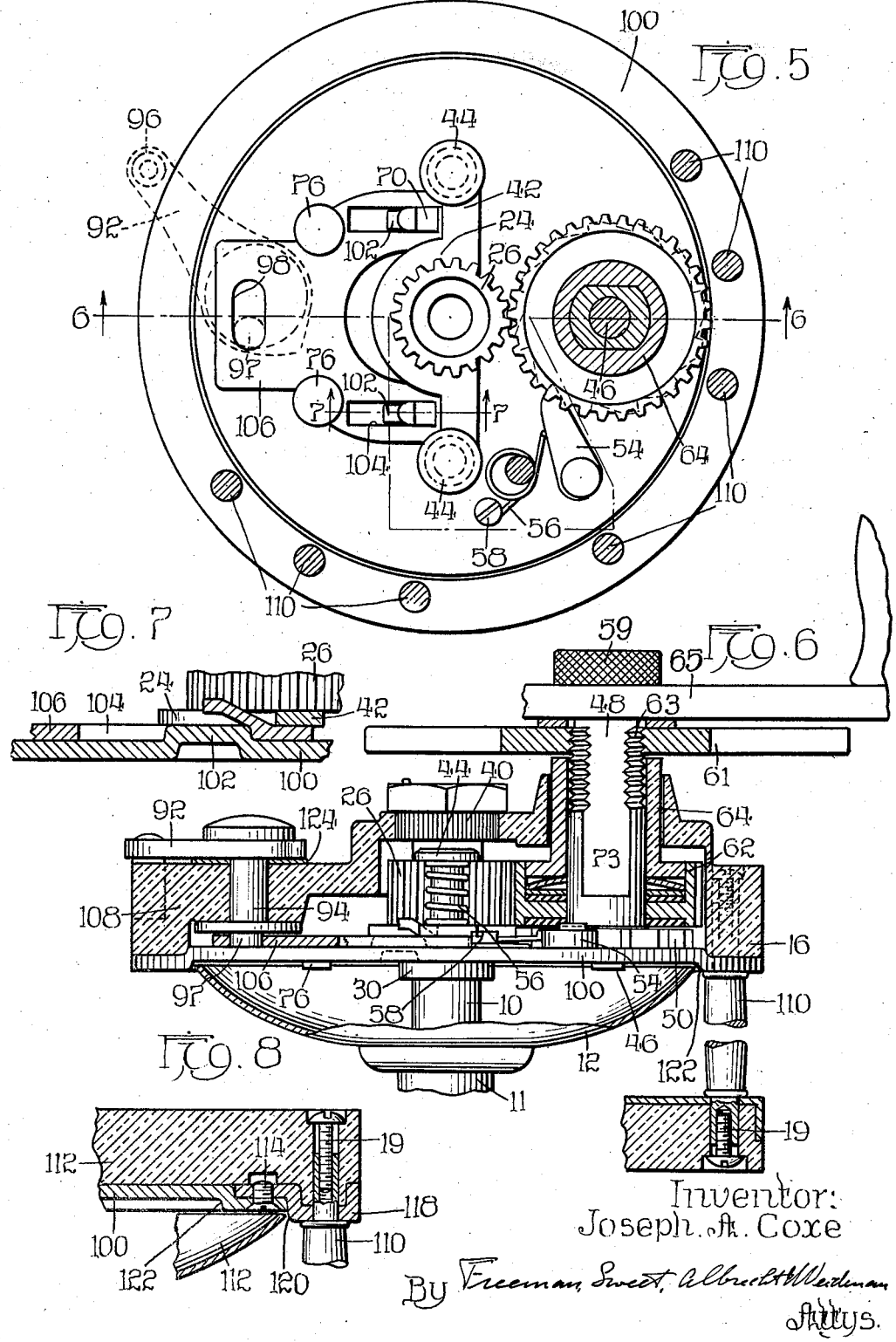

2,162,774

UNITED STATES PATENT OFFICE 2,162,774

REEL

Joseph A. Coxe, Los Angeles, Calif.

Application July 13, 1936, Serial No. 90,370

12 Claims. (Cl. 242—84.7)

The invention relates to fishing reels and includes among its objects and advantages increased durability and certainty of operation in a free spool reel.

Further objects and advantages of the invention will become apparent as the description proceeds.

In the accompanying drawings:

Figure 1 is a plan view of a free spool mechanism, partly in section, on line 1—1 of Figure 2;

Figure 2 is a section on line 2—2 of Figure 1;

Figure 3 is a section on line 3—3 of Figure 1;

Figure 4 is a section on line 4—4 of Figure 1;

Figure 5 is a plan view of a modification;

Figure 6 is a section on line 6—6 of Figure 5;

Figure 7 is a detail section on line 7—7 of Figure 5; and

Figure 8 is a detail section of an oversize reel using the same transmission chassis.

In the embodiment of the invention selected for illustration, the reel comprises the usual spool shaft 10, sleeve 11, and end bells 12, only one of which has been illustrated. The head end plate 14 is of Bakelite with a metal facing at 16. It may be connected with the tail plate 15 in the usual way by a plurality of pillars 17 fastened in place by screws 19. The frame plate 18 is rigidly fastened to the head end plate 14 as by means of four fastening screws 20. Between the frame plate 18 and the head end plate 14 lies the cam plate 22, and between the cam plate 22 and the head end plate 14 lies the lifting yoke 24. The drive pinion 26 has an intermediate annular groove at 28 receiving the edge of the yoke 24. The spool end of the gear is provided with a female clutch member at 30, such, for instance, as that illustrated in the co-pending application of John V. Schafer, Serial Number 4,731, filed February 4, 1935. The adjacent end of the spool shaft 10 includes a male clutch member at 32, a large diameter journal at 34 fitting the bore 36 in the gear 26, and an end pivot 38 journaled in a suitable bearing at 40.

Suitable means are provided for rotating the gear 26. I have illustrated a stud 46 rigidly mounted on the frame plate 18, about which rotates the tubular drive shaft 48, having the integral ratchet wheel 50 at its lower end. The teeth 52 of the ratchet wheel are engaged by a pawl 54 to prevent rotation of the shaft in the direction of reeling out. The spring 56 for actuating the pawl 54 has one end clamped on the frame plate at 58 and is then wrapped around one of the fastening screws 20 with its free end 60 bearing against the pawl 54.

The drive gear 62 is constantly in mesh with the spool pinion 26, and is connected to the shaft 48 by a variable friction drive including the thrust sleeve 64 and the friction washers 66 lying on opposite sides of the web of the gear. The sleeve 64 may be forced down by the usual star wheel 61 threaded on the threads 63 below the drive crank 65, held in place by the usual knurled nut 59. To secure gradual and accurately controllable application of the friction a resilient cupped washer 67 is interposed between the upper friction washer 66 and the flange 69 of the sleeve 64. In sizes where the washer 67 tends to abrade the outer edge of adjacent friction washer a flat protecting washer 71 is interposed to distribute the load. The sleeve 64 and washers 67 and 71 all turn with the drive shaft 48, being shaped to fit the flattened portions 73 of the drive shaft for that purpose. The strength of the washer 67 is such that nearly the entire range of friction loads for which the reel is designed can be obtained without completely flattening the washer 67. At, or slightly below, the maximum safe load on the parts, the washer 67 is completely flattened and the force generated by screwing down the star wheel 61 is transmitted by direct thrust.

The yoke 24 includes a central U-shaped portion engaging the groove 28 in the gear 26, and oppositely directed arms 42. Headed studs 44 rigid with the frame plate 18 pass through the ends of the arms 42. Helical compression springs 56 encircling the studs 44 push downwardly on the arms 42 and tend to move the yoke 24 downwardly and the clutch members 30 and 32 into engagement.

The cam plate 22 includes spaced arms 68 underlying the arms 42. Lifting cams 70 formed on the arms 68 operate to raise the yoke 24 whenever the cam plate 22 is moved to the right from the position shown in Figure 1. Movement of the cam plate to the left from the position of Figure 1 is prevented by turned down toes 72 on the ends of the arms 68 (see Figure 3) entering into openings 74 in the frame plate 18, and the plate 22 is further guided by the heads 76 of short studs positioned to engage the straight sides 78 of the body of the plate. In Figures 1 and 2 the upper and lower left corners of the cam plate 22 carry arms 80, offset upwardly at 82, and then extending forward as at 84 with their ends passing through guiding apertures in lugs 86 turned up from the frame plate 18. Compression springs 88 push on the arms 80 and normally hold the cam plate in the position of Figure 1. I have illustrated seat washers 90 providing abutments for the ends of the springs 88.

The actuating means illustrated includes the shift lever 92 rigid with the shaft 94 journaled in the head end plate 14 and carrying an operating handle 96 at its other end. The handle 96 of the lever 92 projects axially into the plane of the head end plate 14, but the parts are so designed that the lever comes to rest in either extreme position with the handle 96 close to but out of contact with the adjacent edge of the head end plate. The shaft 94 carries an eccentric shifting pin 97 which enters the slot 98 in the cam plate 22. It will be apparent that rotation of the shifting lever in a counterclockwise direction from the position of Figure 1 will force the cam plate 22 over to the right and move the cams 70 under the arms of the yoke 24, thus lifting the yoke and removing the female clutch member 30 from operative engagement with the male clutch member 32. This movement continues until the pin 97 has gone past dead center position, and therefore the force of the springs 88 will assist in holding the lever 92 in either extreme position.

It will be apparent that in disassembling the reel for cleaning and inspection, unfastening the head end plate 14 from pillars 17 permits withdrawal of the head end plate from the pillars and from the spool, with all the working mechanism of the reel still undisturbed. The adjacent end of the shaft 10, as indicated in Figure 4, simply slips out of its bearings at 40 and 36. Furthermore, after this separation, removal of the nut 59, crank 65 and star wheel 61, leaves no obstacle to removal of screws 20 and separation of all the working assembly of the reel, still in the form of an undisturbed unitary assembly, with which the star wheel 61, crank 65, and nut 59 can be reassembled to keep them from getting lost. Only the spool bearing 40 and the manual adjustment means 92, 94, 96, 97 remain with the end plate 14, and the condition and operation of the entire transmission and clutch-actuating means can be inspected and tested. The plate 18 thus constitutes a subordinate frame or chassis carrying all the vital transmission parts. In case some injury requiring factory overhaul or replacement has been sustained by any of these parts, the chassis can be returned separately, or a new chassis installed in the old end plate. When a new chassis is put in all the vital transmission parts are as perfectly adjusted to each other as in a complete new reel, independent of the mechanical skill, or lack of skill, of the owner of the reel.

Referring now to Figures 5, 6 and 7 the parts assembled with the plate 100 are identical with those of Figure 1, except that lugs 86, springs 88, and the projection on the cam plate for carrying said springs have been omitted, and toes 72 have been replaced by lugs 102 stamped up from plate 100 and entering slots 104 in the cam plate 106.

The Bakelite plate 108 is a mere housing, inasmuch as the pillars 110 pass through the edges of the plate 100. Such a construction permits the use of an identical chassis for reels of different diameters. Thus in Figure 8 the same plate 100 is assembled with a Bakelite plate 112 of larger diameter. In such a construction I reinforce the Bakelite by an extension ring 118 of equal strength with the plate 100 and fastened to the plate 100 by screws 114. The ring 118 has two corrugations to stiffen it, and the inner corrugation projects out, as at 120, to shield the adjacent edge of the end bell 112. The similar offset at 122 in the plate 100 no longer functions as a line guard, but is still effective in stiffening the plate 100.

In both embodiments the clutch members 30 and 32 stop a few thousandths of an inch short of axial abutment, so that the load of springs 56 is carried between the plate 18 and the heads of studs 44, and not imposed as a friction load on the tail end bearing.

In the embodiment of Figures 5 to 8, the best operation in use is obtainable with the lever 92 loosely pivoted and with pin 97 having a clearance of a few thousandths of an inch in its slot 98. However, the inexperienced purchaser is apt to consider the resulting play in the lever 92 as a mechanical defect instead of the advantage it really is. The very light friction needed to keep the lever 92 from rattling, without interfering with effective operation in use, can best be provided by a very light spring washer at 124 (see Figure 6).

Without further elaboration, the foregoing will so fully explain the invention that others may, by applying knowledge current at the time of application, readily adapt the same for use under various conditions of service.

I claim:

1. In a free spool fishing reel, in combination: spaced plates; frame connections uniting said plates into a unitary frame; a rotatable spool within said frame having a shaft; a transmission for driving said spool including gearing, an adjustable friction drag, and clutch means; externally accessible manual control means carried by one plate, for engaging and disengaging said clutch means; externally accessible removable manual drag adjustment means for said friction drag, carried by said transmission; an externally accessible removable crank carried by said transmission for actuating said transmission; and a stationary chassis plate mounted on said last mentioned plate and carrying said entire transmission; said chassis plate and transmission being removable as a unitary assembly from the spool, frame connections and plates constituting the rest of said reel.

2. In a free spool fishing reel, in combination: spaced head end and tail end plates; connections uniting said plates into a unitary frame; a rotatable spool having a shaft; a transmission for driving said spool including gearing, an adjustable friction drag for braking the movement of said gearing, and clutch means for connecting said gearing to said spool; and a stationary chassis plate mounted on said head end plate and carrying said entire transmission; said chassis plate and transmission being removable from said head end plate as a unitary assembly.

3. In a free spool fishing reel, in combination: a chassis plate having an offset rim; a spool having an end bell; the edge of said end bell being guarded by said rim; a complete transmission carried by said chassis plate for rotating said spool; a non-metallic cover plate overlying the side of said chassis plate remote from said spool and with said chassis plate defining a transmission housing; said transmission including a drive shaft projecting through said cover plate; a removable crank on the end of said drive shaft; said transmission including a free spool clutch means; manual control means passing through said cover plate and projecting on both sides thereof, for controlling said clutch means; said transmission including variable friction drive and drag means; a rotatable manual control element outside said housing co-axial with said drive shaft and lying between said crank and said cover plate, and connections between said last mentioned control element and said friction means, for adjusting said friction means; a tail plate spaced from said chassis plate and cover plate; pillars fastened at one end to said tail plate; said pillars passing through the edges of said chassis plate and cover plate to unite them and said tail plate into a rigid frame; and means other than said pillars, for detachably fastening said chassis plate to said cover plate.

4. In a fishing reel, in combination: a chassis plate; a spool; a transmission carried by said chassis plate for rotating said spool; a non-metallic cover plate overlying the side of said chassis plate remote from said spool and with said chassis plate defining a transmission housing; a tail plate spaced from said chassis plate and cover plate; pillars fastened at one end to said tail plate; said pillars passing through the edge of said cover plate to unite said cover plate only and said tail plate into a rigid frame; and means other than said pillars, for detachably fastening said chassis plate to said cover plate.

5. In a free spool fishing reel, in combination: a chassis plate having an offset rim; a spool having an end bell; the edge of said end bell being guarded by said rim; a transmission carried by said chassis plate for rotating said spool; a non-metallic cover plate overlying the side of said chassis plate remote from said spool and with said chassis plate defining a transmission housing; said transmission including a free spool clutch means; manual control means passing through said cover plate and projecting on both sides thereof, for controlling said clutch means; and means for detachably fastening said chassis plate to said cover plate.

6. In a fishing reel, in combination: a chassis plate having an offset rim; a spool having an end bell; the edge of said end bell being guarded by said rim; a transmission carried by said chassis plate for rotating said spool; a non-metallic cover plate overlying the side of said chassis plate remote from said spool and with said chassis plate defining a transmission housing; a tail plate spaced from said chassis plate and cover plate; pillars fastened at one end to said tail plate; said pillars passing through the edge of said cover plate to unite it and said tail plate into a rigid frame; and means other than said pillars, for detachably fastening said chassis plate to said cover plate.

7. In a fishing reel, in combination: a chassis plate; a spool; a transmission carried by said chassis plate for rotating said spool; a non-metallic cover plate overlying the side of said chassis plate remote from said spool and with said chassis plate defining a transmission housing; said transmission including a drive shaft projecting through said cover plate; a removable crank on the end of said drive shaft; said transmission including a free spool clutch means; manual control means passing through said cover plate and projecting on both sides thereof, for controlling said clutch means; said transmission including variable friction drive and drag means; a rotatable manual control element outside said housing co-axial with said drive shaft and lying between said crank and said cover plate, and connections between said last mentioned control element and said friction means, for adjusting said friction means; and means for detachably fastening said chassis plate to said cover plate.

8. In a fishing reel, in combination: a chassis plate having an offset rim; an extension ring having its inner edge fastened to said rim; said ring having an offset portion; a spool having an end bell; the edge of said end bell being guarded by said offset ring portion; a transmission carried by said chassis plate for rotating said spool; a cover plate overlying said ring and chassis plate and housing said transmission; a tail plate spaced from said chassis plate and cover plate; pillars fastened to said tail plate; said pillars passing through the said ring and cover plate to unite them and said tail plate into a rigid frame.

9. In a fishing reel, in combination: a plate having an offset rim; an extension ring having its inner edge fastened to said plate; said ring having an offset portion; a spool having an end bell; the edge of said end bell being guarded by said offset ring portion; a cover overlying the side of said plate remote from said spool and with said plate defining a transmission housing; a tail plate spaced from said plate and cover; pillars fastened to said tail plate; said pillars passing through the edge of said cover to unite it and said tail plate into a rigid frame; and means other than said pillars, for detachably fastening said plate to said cover.

10. In a free spool fishing reel, in combination: a spool; end plates between which said spool is pivotally mounted; a chassis plate mounted on one of said end plates; an axially slidable clutch member and a shifting member for sliding said clutch member, both mounted on said chassis plate; said clutch member, shifting member, and chassis plate being separately removable as a unitary assembly.

11. In a fishing reel, in combination: spaced head and tail end plates; connections uniting said plates into a unitary reel frame; a rotatable spool within said reel frame having a shaft; a transmission for driving said spool including a driving gear and a driven pinion; and a stationary chassis plate mounted on said head end plate independently of said reel frame and carrying said transmission; said chassis plate and transmission being separately removable from said head end plate as a unitary assembly.

12. In a fishing reel, in combination: spaced head and tail end plates; connections uniting said plates into a unitary reel frame; a rotatable spool within said reel frame having a shaft; a transmission for driving said spool including a driving gear and a driven pinion; and a stationary chassis plate mounted on said head end plate and carrying said transmission; said chassis plate and transmission being separately removable from said head end plate as a unitary assembly.

JOSEPH A. COXE.